United States Patent [19]

Aoki

[11] Patent Number: 5,434,723
[45] Date of Patent: Jul. 18, 1995

[54] INFORMATION DATA RECORDING/REPRODUCING APPARATUS

[75] Inventor: Shinji Aoki, Kanagawa, Japan

[73] Assignee: Sony Corporation, Tokyo, Japan

[21] Appl. No.: 156,407

[22] Filed: Nov. 19, 1993

Related U.S. Application Data

[63] Continuation of Ser. No. 591,271, Oct. 1, 1990, abandoned.

[30] Foreign Application Priority Data

Oct. 2, 1989 [JP] Japan .................................. 1-257562

[51] Int. Cl.⁶ .......................... G11B 21/04; G11B 5/02
[52] U.S. Cl. ..................................... 360/70; 360/36.1; 360/22; 360/64
[58] Field of Search ..................... 360/19.1, 36.1, 40, 360/22, 32, 51, 70, 23, 64, 27, 73.09, 73.03, 77.02, 72.2, 49, 5, 6, 35.1, 18

[56] References Cited

U.S. PATENT DOCUMENTS

| | | | |
|---|---|---|---|
| 4,392,162 | 7/1983 | Yamamoto | 360/10.3 |
| 4,746,996 | 5/1988 | Furuhata et al. | 360/36.2 |
| 4,811,128 | 3/1989 | Ono et al. | 360/70 |
| 4,910,605 | 3/1990 | Sasaki et al. | 360/10.3 X |
| 4,914,527 | 4/1990 | Asai et al. | 360/19.1 |
| 5,063,453 | 11/1991 | Yoshimura et al. | 360/32 |

FOREIGN PATENT DOCUMENTS

| | | |
|---|---|---|
| 0224186 | 6/1987 | European Pat. Off. . |
| 2488431 | 2/1982 | France . |
| 2907834 | 9/1980 | Germany . |
| 3704329 | 8/1987 | Germany . |
| 3819393 | 12/1988 | Germany . |
| 2080997 | 2/1982 | United Kingdom . |
| 2083666 | 3/1982 | United Kingdom . |
| 2088115 | 6/1982 | United Kingdom . |

OTHER PUBLICATIONS

IEEE Transactions on Consumer Electronics vol. CE-33, No. 3, Aug. 1987, New York, US K. Itoh "A New Multi-Functional Digital Servo lsi For Home VCR" p. 214, last paragraph p. 215, line 17.

*Primary Examiner*—Aristotelis Psitos
*Assistant Examiner*—Varsha A. Kapadia
*Attorney, Agent, or Firm*—William S. Frommer; Alvin Sinderbrand

[57] ABSTRACT

An information data recording/reproducing apparatus where input information data is divided into sectors and distributed to be recorded on a magnetic tape by a plurality of magnetic heads. In a recording mode, the sector phase of the information data to be recorded is identified by input sync data which represents the phase relation thereto. In a playback mode, the sync data which identifies the sector phase of the recorded information data is obtained form the magnetic tape and used to control the playback operation. The phase relation of the information data can be restored exactly.

3 Claims, 11 Drawing Sheets

SEC SECTOR (TR RECORD TRACK)

DO (OUTER DATA BLOCK)

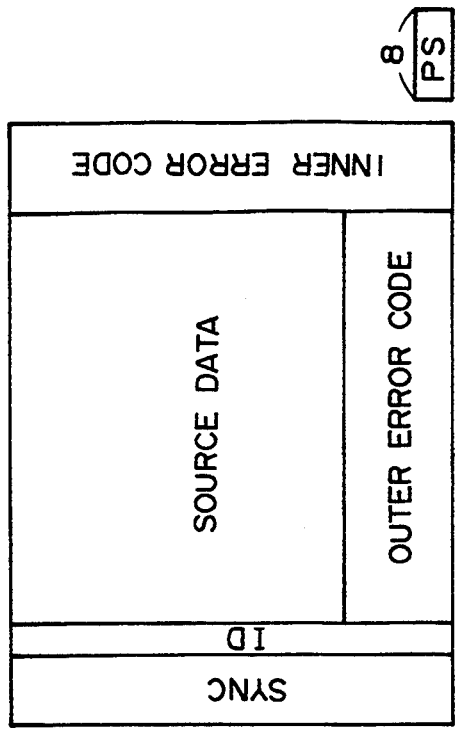
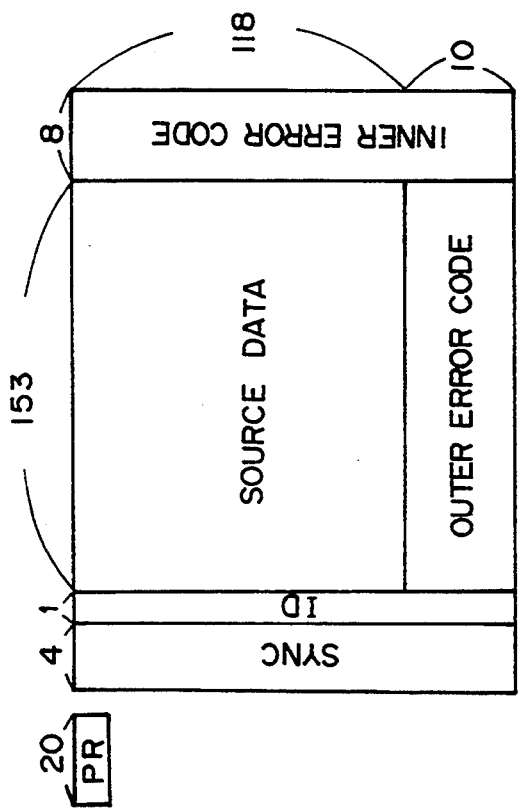
FIG. 7
(RELATED ART)

INFORMATION DATA RECORDING/REPRODUCING APPARATUS

This application is a continuation of application Ser. No. 07/591,271, filed Oct. 1, 1990, now abandoned.

BACKGROUND OF THE INVENTION

1. Field of the Invention

The present invention relates to an information data recording/reproducing apparatus adapted to record and/or reproduce information data, such as a data recorder based on, for example, the ID-1 format.

2. Description of the Prior Art

A data recorder based on an ANSI ID-1 format (Third Draft, PROPOSED AMERICAN NATIONAL STANDARD 19 mm TYPE ID-1 INSTRUMENTATION DIGITAL CASSETTE FORMAT, X3B6/88-12 Project 592-D 1988-03-22) has been proposed to perform high-density recording of information.

In such a data recorder, error correction for the information data is effected by employing a product encoding notation with Reed-Solomon code and recording it on a magnetic tape. In a playback mode, any transmission error is thereby detected and corrected.

FIGS. 1–8 relate to this type of ID-1 data recorder, and will now be described.

FIG. 1 illustrates a typical recording pattern formed on a magnetic tape by a data recorder based on the ID-1 format. In this diagram, ANN identifies an annotation track for recording notes thereon, and data tracks TR1, TR2, TR3 and so forth record information data, wherein 1 sector is formed per data track. The data tracks are recorded alternately by heads with different azimuths. Further shown are a control track CTL for recording a control signal, and a time code track TC for recording a time code.

The content of each of the data tracks TR1, TR2, TR3, ... is illustrated in FIG. 2. Specifically, one data track TR records one sector SEC and is constituted by a preamble PR, a data recording portion DT and a postamble PS. The preamble PR is recorded in the generally lower portion at the beginning of the oblique data track.

The preamble PR is comprised of a 20-byte ascending sequence RUS, a 4-byte sync code $SYNC_{PR}$, 4-byte sector identification data $ID_{SEC1}$, and 6-byte auxiliary data $DT_{AUX}$, arranged as illustrated.

The adjacent data recording portion DT is comprised of 256 sync blocks BLK ($BLK_0$, $BLK_1$, $BLK_2$, ... $BLK_{255}$) in which the information data is recorded. Each sync block BLK is formed of a 4-byte block sync code $SYNC_{BLK}$, 1-byte block identification $ID_{BLK}$ data, 153-byte inner data DI (inner-coded input information data) and an 8-byte parity code RI based on Reed-Solomon code notation.

The further adjacent postamble PS is comprised of a 4-byte sync code $SYNC_{PS}$ and 4-byte sector identification data $ID_{SEC2}$.

FIG. 3 shows a recording system in accordance with the ID-1 format. In this recording system, the input information data is recorded after being encoded for error correction by product code notation.

The operation of the recording system is performed in the following manner. 8-bit (1-byte) input information data $DT_{USE}$ is supplied to an outer encoder 2. As shown in FIG. 4, this encoder generates, by the use of a predetermined polynomial with regard to the data blocks (each data block is comprised of 118 bytes of the input information data $DT_{USE}$), outer codes which are parity codes $RO_0$–$RO_{305}$. Each parity code RO is comprised of a 10-byte Reed-Solomon code and each such parity code is added to the end of each data block, which is thereafter provided as an outer data block DO. The outer data block DO is fed via a first multiplexer 3 to a memory unit 4. FIG. 5 shows the structure of the memory unit 4 and the data arrangement therein. As shown, the memory unit 4 is comprised of memories MEM1 and MEM2, each having a capacity of 154 bytes in a row and 128 bytes in a column. In this example, 153 outer data blocks $DO_0$–$DO_{152}$ generated sequentially by outer encoder 2 are stored in the memory MEM1, while the next 153 outer data blocks $DO_{153}$–$DO_{305}$ generated sequentially by the outer encoder following the outer data blocks $DO_0$–$DO_{152}$ are stored in the memory MEM2 in such a manner that 1 outer data block is written per column. The information data of 1 outer data block is formed of 118 bytes and, since 153 blocks of information data are written in each of the memories MEM1 and MEM2, it follows that a total of $118 \times 153 \times 2$ bytes (=36,108 bytes) of the information data are written in the memory unit 4.

The data writing direction in each column of the memories MEM1 and MEM2 is indicated by an arrow A in FIG. 5, and the lower 10 bytes in each column of the memories MEM1 and MEM2 correspond to the outer code.

There are also fed, via the first multiplexer 3 to the memory unit 4, data block identification data $ID_B$ generated from an identification data generator 5 for identifying the individual rows in the memories MEM1 and MEM2. Even components $ID_{BE}$ of such data block identification data $ID_B$ are written into a predetermined column of the memory MEM1 while odd components $ID_{BD}$ thereof are written into a predetermined column of the memory MEM2 in the direction A.

The data thus written in the memories MEM1 and MEM2 are read out therefrom in the direction B in such a manner that the data of each row is processed as one block. The data reading operation for individual rows is performed alternately, with respect to the memories MEM1 and MEM2, in the order conforming to the data block identification data $ID_B$ (00, 01, 02, 03, ...).

The data read out from the memories MEM1 and MEM2 is supplied to an inner encoder 6.

This encoder 6 generates, by the use of a predetermined polynomial with regard to each of the input data blocks, inner codes which are parity codes $RI_0$–$RI_{255}$ each formed of an 8-byte Reed-Solomon code. As shown in FIG. 6, such parity codes are added to the ends of the data blocks respectively to form inner data blocks $DI_0$–$DI_{255}$, which are then applied to a second multiplexer 7.

The second multiplexer 7 selectively produces at its output the preamble data PR and the postamble data PS formed by a preamble/postamble generator 8 on the one hand, and the inner data blocks $DI_0$–$DI_{255}$ supplied from the inner encoder 6 on the other hand. Such data are produced in the following order: the preamble data PR, the inner data blocks $DI_0$–$DI_{255}$ and the postamble data PS. The output for the second multiplexer 7 is fed to a data randomizer 9.

In the data randomizer 9, the data is randomized by taking an exclusive OR with regard to every byte of the input data and predetermined data. The data thus randomized is applied to an 8-9 modulator 10.

In this modulator 10, the form of the data is converted from 8-bit data to 9-bit data for the purpose of achieving a DC-free state by removal of the DC component from the signal waveform that will be recorded on the magnetic tape. Such conversion is performed in the following manner. With regard to each of 256 values of the input data where each byte is composed of 8 bits, two kinds of 9-bit data may be used in the ID-1 format to represent that 8-bit data. The codeword digital sums (CPS) of these two kinds of 9-bit data differ from each other in polarity. The 8-9 modulator 10 monitors the digital sum variation (DSV) of the 9-bit data produced from the input data and selects one or the other of the two kinds of 9-bit data such that the CDS value thereof reduces the DSV value to zero. Thus, input 8-bit data is converted into DC-free 9-bit data. The 8-9 modulator 10 includes a circuit for converting the input data of NRZL (non-return to zero level) form into that of NRZI (non-return to zero inverse) form. The 9-bit output data of the 8-9 modulator 10 in NRZI form is supplied to a third multiplexer 11.

In the third multiplexer 11, a sync code $SNYC_B$ of a fixed 4-byte length obtained from a sync code generator 12 is added to each of the inner data blocks $DI_0$–$DI_{255}$, whereby sync blocks $BLK_0$–$BLK_{255}$ are formed. The pattern of such sync code $SYNC_B$ is determined on the basis of the ID-1 format, and the pattern to be recorded on the magnetic tape is so prescribed as to conform with such code pattern.

The delta obtained in the above processes is shown in the form of maps in FIG. 7. The output of the third multiplexer 11 has a data array obtained by scanning such maps MAP1 and MAP2 in the horizontal direction. The further detail thereof is illustrated in FIG. 2. The output of the third multiplexer 11 is fed to a parallel-to-serial converter 13.

In the parallel-to-serial converter 13, the input parallel-bit data of preamble PR, sync blocks $BLK_0$–$BLK_{255}$ and postamble PS is converted into serial-bit data $S_{REC}$. Such serial data $S_{REC}$ is amplified by a record amplifier 14 and then is supplied as a record signal to a magnetic head 16 which scans the magnetic tape 15 in a helical scanning mode, whereby record tracks TR ( . . . , TR1, TR2, TR3, TR4, . . . ) are formed on the magnetic tape 15 as illustrated in FIG. 1.

In this manner, the recording system operates to add an error correction code, which is based on the Reed-Solomon product code notation, to the desired information data $DT_{USE}$ to be recorded.

The information data $DT_{USE}$ thus recorded on the magnetic tape 15 by the recording system of FIG. 3 is reproduced by a reproducing system illustrated in FIG. 8 which operates inversely to the operation performed by the recording system.

In this reproducing system, the record tracks TR ( . . . , TR1, TR2, TR3, TR4, . . . ) on the magnetic tape are reproduced by a magnetic head 16 as a playback signal $S_{PB}$, which is then supplied to a playback amplifier 21.

The playback amplifier 21 includes an equalizer and a binary encoder, wherein playback digital data $DT_{PB}$ is obtained by encoding the input playback signal $S_{PB}$ in binary notation. This binary-encoded playback data $DT_{PB}$ then is supplied to a serial-to-parallel converter 22 for conversion into 9-bit parallel data $DT_{PR}$.

In a sync code detector 23, the 4-byte sync code $SYNC_N$ is detected from a stream of parallel data $DT_{PR}$, and the sync block is identified in accordance with the detected sync code. The sync code detector 23 includes a circuit for converting the NRZI-form parallel data $DT_{PR}$ into NRZL-form data.

The output of the sync code detector 23 is coupled to an 8-9 demodulator 24, where the data that had been processed by 8-to-9 bit conversion to be rendered DC-free in the recording system is demodulated to return to an 8-bit combination again. The demodulator 24 includes a ROM (read-only memory) and converts the 9-bit data to 8-bit data by a retrieval process compatible with the 8-9 bit conversion process.

The 8-bit data thus restored is derandomized in a derandomizer 25 through a process inverse to the randomization process executed in the recording system. Such derandomization is achieved by calculating the exclusive OR of the predetermined data used for the randomization and the input data fed to the derandomizer 25 from demodulator 24.

An inner code error detector/corrector 26 performs error detection and correction by using the 8-byte inner error code $RI_0$–$RI_{255}$ that had been added to the inner data blocks $DI_0$–$DI_{255}$, respectively, forming the sync blocks $BLK_0$–$BLK_{255}$.

The inner data blocks $DI_0$–$DI_{255}$ following inner code error correction are written in a memory unit 28, which is structurally the same as the aforementioned memory unit 4 of the recording system, shown in greater detail in FIG. 5, on the basis of the 1-byte block identification data $ID_B$ that had been added to each block and that is now detected by an identification data detector 27. Consequently, one data block is written in one row. The data writing order is the same as the order in which the data had been read out from the memory unit 4 in the recording system, and the data blocks $DI_0$–$DI_{255}$ are written in the memories MEM1 and MEM2 row by row alternately in conformity with the block identification data. The data thus written into the rows of the memories MEM1 and MEM2 of the memory unit 28 are read out column by column in the same order as the data had been written into the columns of memory unit 4 of the recording system. Consequently, the 128-byte outer data blocks $DO_0$–$DO_{305}$ are restored.

An outer code error detector/corrector 29 performs error detection and correction on the output data blocks $DO_0$–$DO_{305}$ read from the memory unit 28, by using the 10-byte outer code $RO_0$–$RO_{305}$ that had been added to the data blocks respectively.

Thus, the information data $DT_{USE}$ recorded on the magnetic tape 15 is reproduced in the manner described above.

In the information data recording/reproducing apparatus of the type just mentioned, the information data $DT_{IN}$ input successively in a recording mode is internally divided into individual sectors or tracks formed by the rotary magnetic head 16 in accordance with a recording pattern such as . . . , TR1, TR2, TR3, TR4, . . . (shown in FIG. 1). And in a playback mode, the divided data of the individual sectors are reproduced and combined with one another to be output as successive playback data $DT_{OUT}$.

Accordingly, for assuring the proper phase relation in a playback mode with regard to the information data $DT_{IN}$, sync data representing the phase relation of that information data $DT_{IN}$ is inserted into the information data $DT_{IN}$ before the information data is supplied to the recording section, and such sync data is used as a reference to attain exact replication of the phase relation during the playback mode.

Heretofore, when the sync data is recorded together with the information data $DT_{IN}$ on the magnetic tape, it is necessary to employ a different data pattern having a distinctive detectable characteristic in comparison with the information data $DT_{IN}$. Consequently, in magnetic recording/reproducing apparatus designed to record arbitrary information data $DT_{IN}$ having an unpredictable bit pattern, in order to retain the unique distinctiveness of the sync data, the redundancy of the sync data is increased greatly.

Other techniques have been contemplated to reference the phase relation of the information data $DT_{IN}$ being recorded, including forming a blank portion in accordance with the phase relation of the information data $DT_{IN}$, or recording, together with the information data $DT_{IN}$, additional data indicative of the beginning or end of the information data or indicative of the record block length. Various combinations of these techniques also have been proposed.

However, the foregoing generally are not successful because they are not easy to adopt, they consume useful data storage capacity due to their high redundancy, and they often are quite complex. Furthermore, even when these proposals for sync data have been used, the proper phase relation of the reproduced information data is not ensured if an error is generated due to dropout or the like on the magnetic tape.

OBJECTS AND SUMMARY OF THE INVENTION

An object of the present invention is to provide improved information data recording/reproducing apparatus having a relatively simple implementation that is capable of exactly maintaining the same phase relation of information data during reproduction that was exhibited by the information data during recording.

Another object of the present invention is to provide improved information data recording/reproducing apparatus which recovers a sync signal that had been used to record information data without increasing the redundancy of such information data.

A further object of the present invention is to provide improved information data recording/reproducing apparatus which accurately restores the original phase relation of reproduced information data even if an error occurs, such as dropout in the reproduced information data.

In accordance with the present invention, information data recording/reproducing apparatus records on a magnetic tape, by a pattern or array of magnetic heads, information data that has been divided into sectors. In a recording mode, the sector phase of the information data to be recorded on the magnetic tape is identified by sync data which is supplied to the apparatus with the information data and represents the phase relation thereof; and in a playback mode, the sync data is obtained to identify the sector phase that is reproduced from the magnetic tape.

According to one aspect of the present invention, the information data recording apparatus has recording circuits for converting input information data into a predetermined format suitable for recording, rotary heads for recording signal outputs of the recording circuits on a recording medium, a rotation servo circuit for controlling the rotation of the rotary heads, and a transport servo circuit for controlling the transport of the recording medium. The input information data is divided into sectors, each corresponding to a predetermined amount of data recordable on a record track. The recording apparatus comprises an input means supplied with a sync signal representing the phase relation of the input information data; a reference sync signal generator means for generating a reference sync signal phase-locked to the sync signal received from the input means; and an information data divider means for dividing, in synchronism with the sync signal obtained from the input means, the input information data into sectors, each corresponding to a predetermined amount of the data, and for supplying the sectors of information data to recording circuits. The recording circuits, the rotation servo circuit and the transport servo circuit of the recording apparatus are operated in synchronism with the reference sync signal generated by the reference sync signal generator means.

According to another aspect of the present invention, information data reproducing apparatus has rotary heads for reproducing sectors of information data that had been recorded on a recording medium in the manner described above, with each sector corresponding to a predetermined amount of the data recordable on a track. The reproducing apparatus includes reproducing circuits for converting the signal played back in predetermined format from the recording medium into its original format. Control signal reproducing means reproduces a control signal that had been recorded on the recording medium in predetermined relation to a record track. A rotation servo circuit controls the rotation of the rotary head, and a transport servo circuit controls the transport of the recording medium. The input information data is recovered from the reproduced information data while the sync signal representing the phase relation of the input information data is also recovered. The reproducing apparatus comprises an input means supplied with an external sync signal for synchronizing the information data reproducing apparatus to an external source; a reference sync signal generator means for generating a reference sync signal phase-locked to the sync signal received from the input means; and an information data derandomizer means for derandomizing the reproduced sectors of information data to restore the reproduced information data to the same state as that of the input information data which had been received in the recording mode. The reproducing circuits, the rotation servo circuit and the transport servo circuit are operated in synchronism with the reference sync signal generated by the reference sync signal generator means, and the sync signal representing the phase relation of the information data recovered from the information data derandomizer means is used to synchronize the reference sync signal generator means.

The above and other objects and features of the present invention will become apparent from the following description which will best be understood in conjunction with the accompanying drawings.

BRIEF DESCRIPTION OF THE DRAWINGS

FIGS. 1 through 8 schematically illustrate a typical data recorder operable in accordance with the ID-1 format, in which:

FIG. 1 shows a recording pattern of the ID-1 format on a magnetic tape;

FIG. 2 shows the content in each record track of the ID-1 format;

FIG. 3 is a block diagram of a recording system;

FIG. 4 represents an output data block produced by an outer encoder included in the recording system;

FIG. 5 represents the structure of a memory unit included in the recording system;

FIG. 6 represents an inner data block produced by an inner encoder included in the recording system;

FIG. 7 shows data maps of the data to be processed in the recording system;

FIG. 8 is a block diagram of a reproducing system;

FIGS. 9 through 12 illustrate features of the present invention, in which:

FIG. 9 is a block diagram of an information data recording/reproducing apparatus which incorporates the present invention;

FIG. 10 is a timing chart that is useful in explaining the recording operation of the apparatus shown in FIG. 9;

FIG. 11 schematically shows the structure of a rotary head assembly that can be used with the present invention; and FIG. 12 shows the relationship of mutual correspondence between record tracks and the magnetic heads of FIG. 11.

DESCRIPTION OF THE PREFERRED EMBODIMENTS

Hereinafter an illustrative embodiment of the present invention is described in detail with reference to the accompanying drawings.

Figure 8:
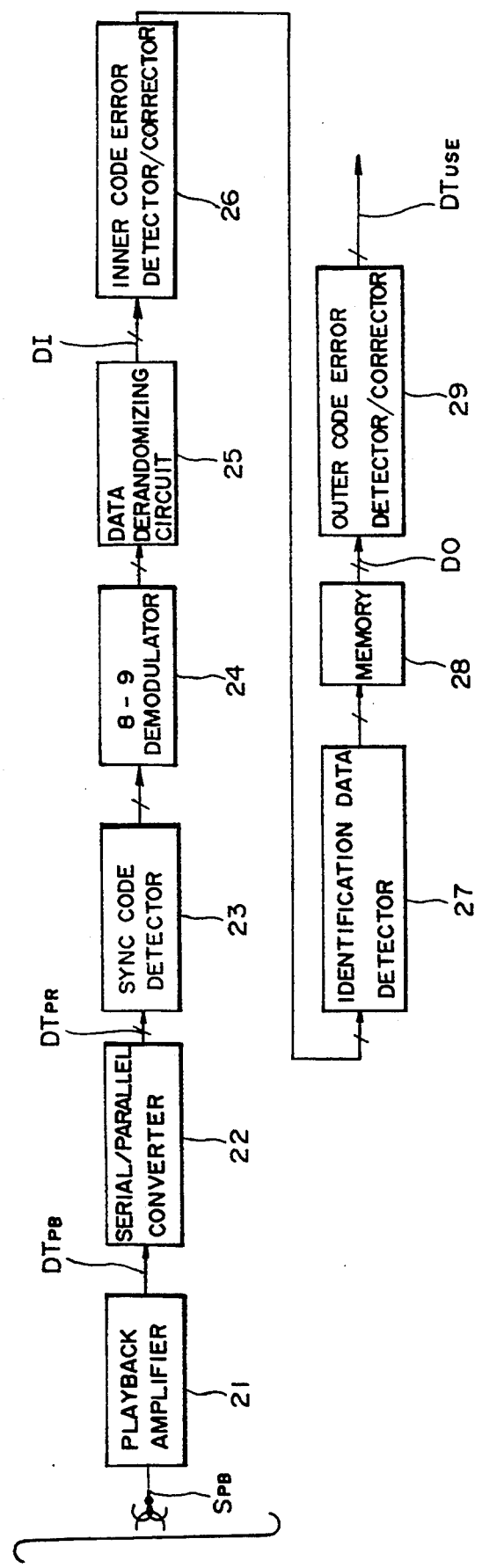
Figure 9:
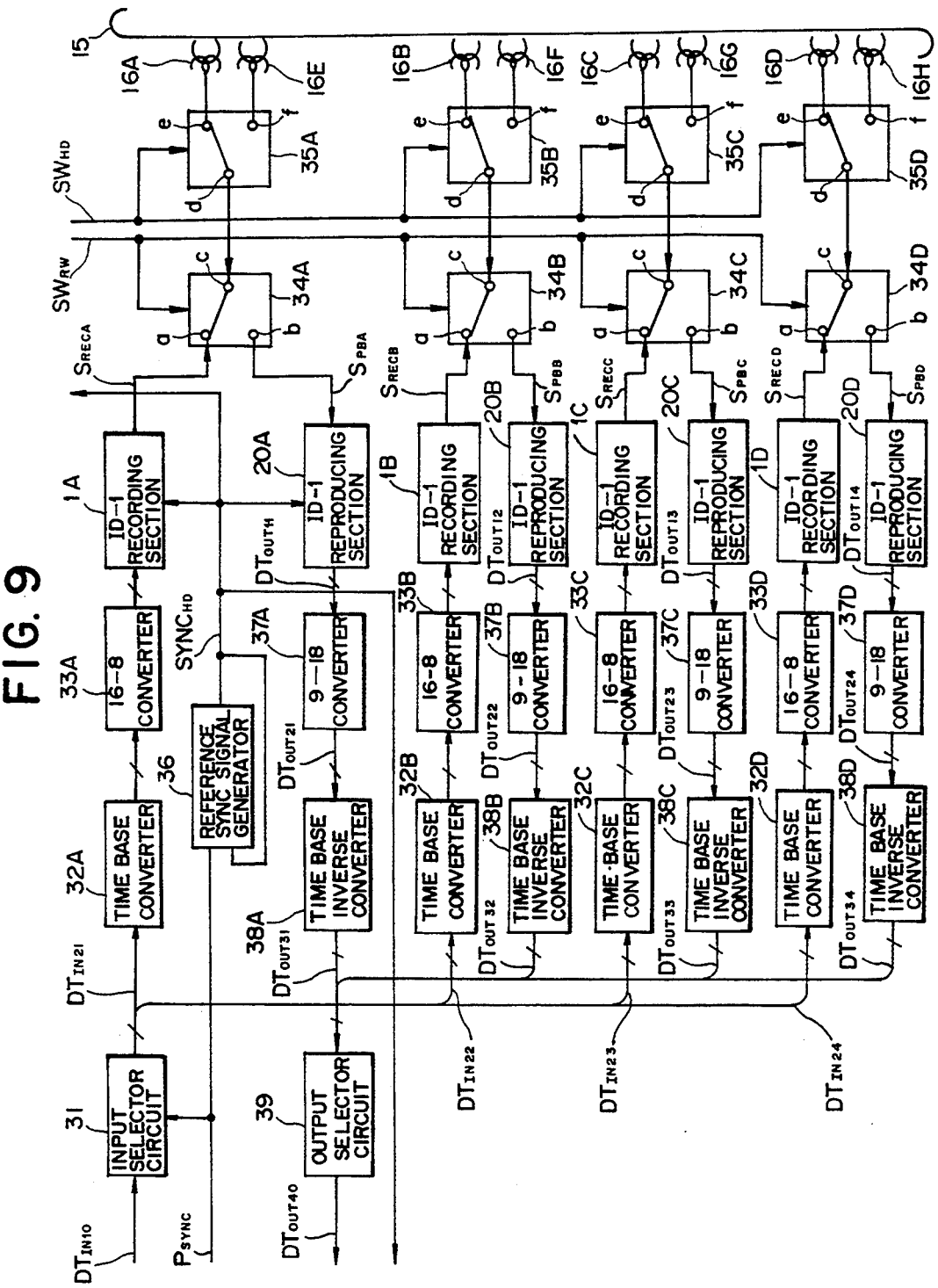

In FIG. 9, where the components corresponding to those used in FIG. 8 are denoted by the same reference numerals, an information data recording/reproducing apparatus which incorporates the present invention comprises four ID-1 recording sections and four ID-1 reproducing sections, each of which complies with the known ID-1 format.

To perform a recording operation, information data $DT_{IN10}$ in 8-bit parallel form having a frequency of 32 MHz, for example, is supplied to an input selector circuit 31.

Figure 1:
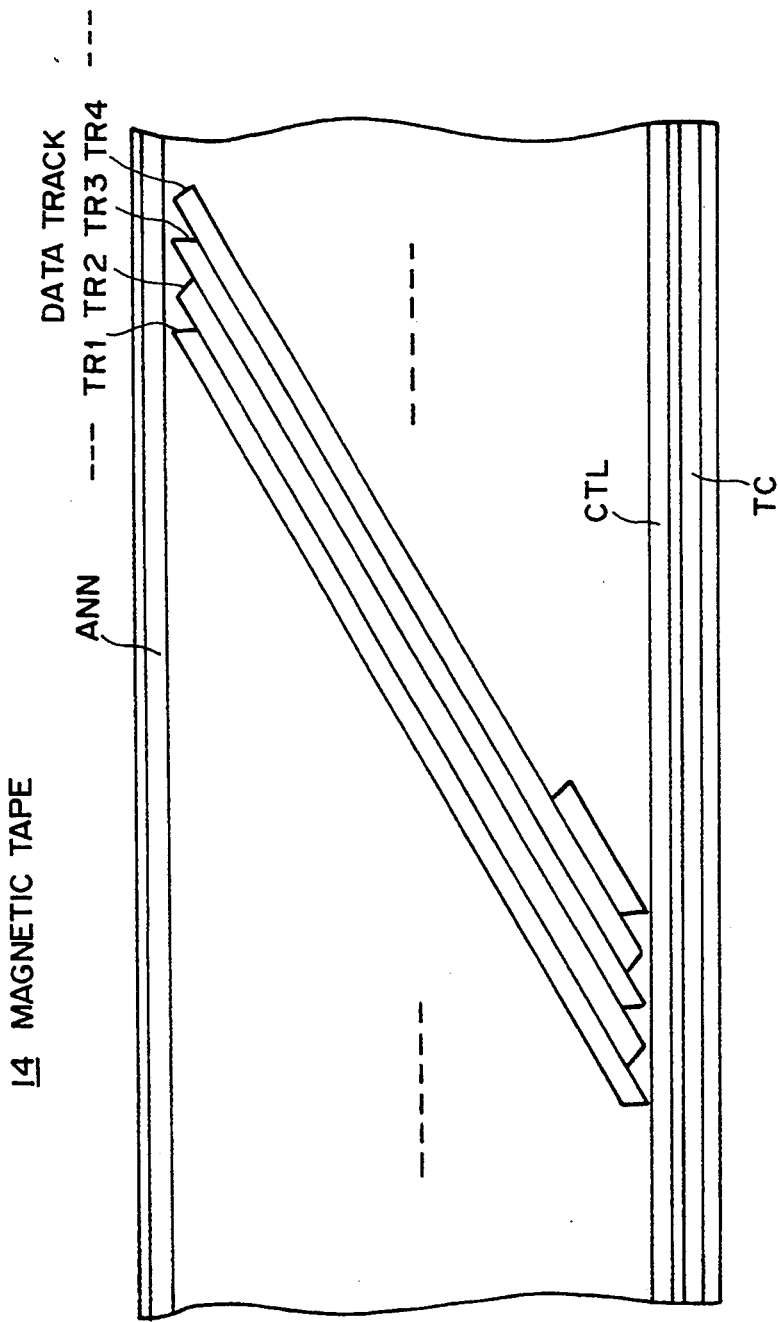
Figure 2:
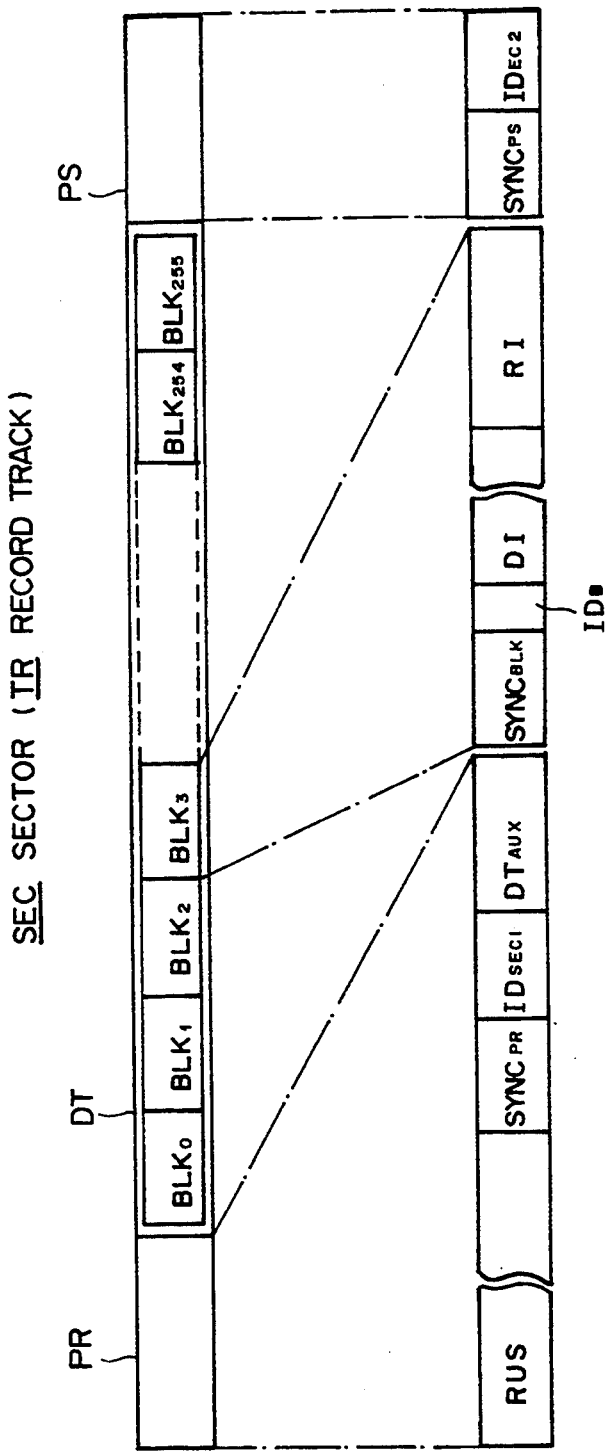
Figure 4:
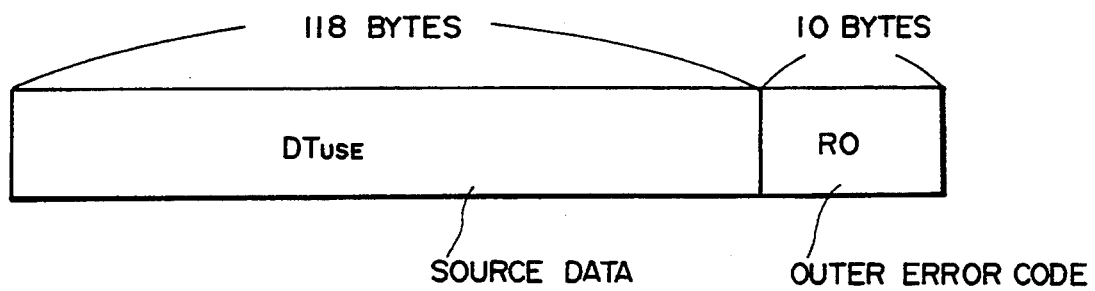
Figure 5:
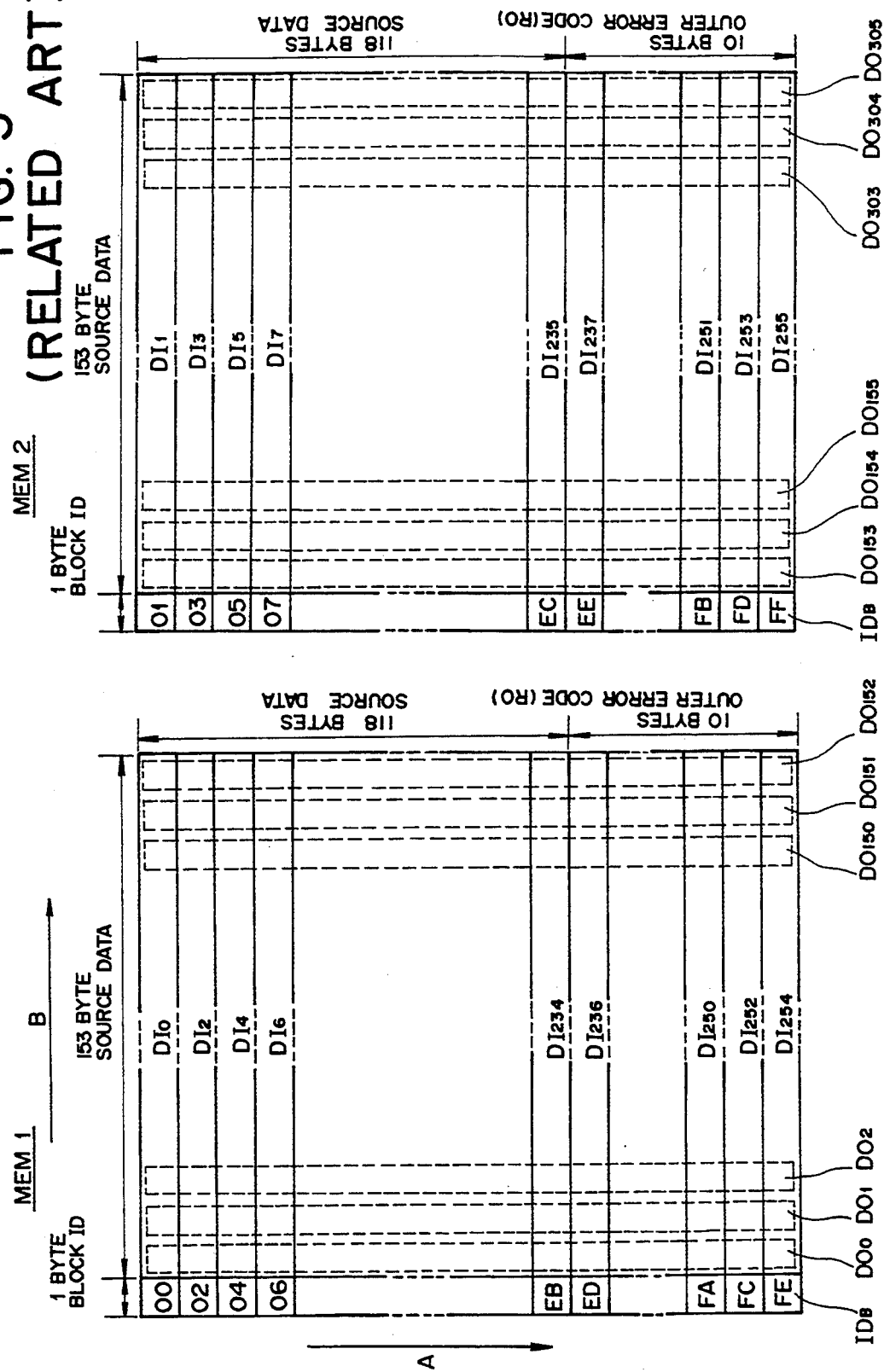
Figure 6:
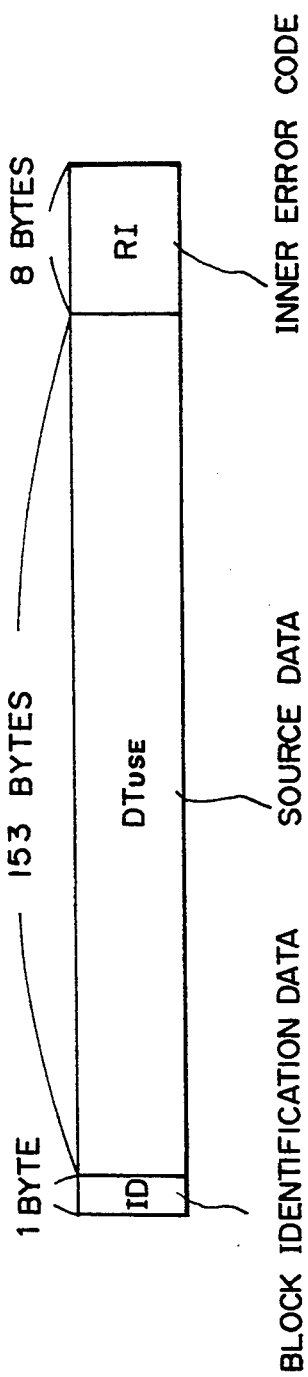
Figure 10:
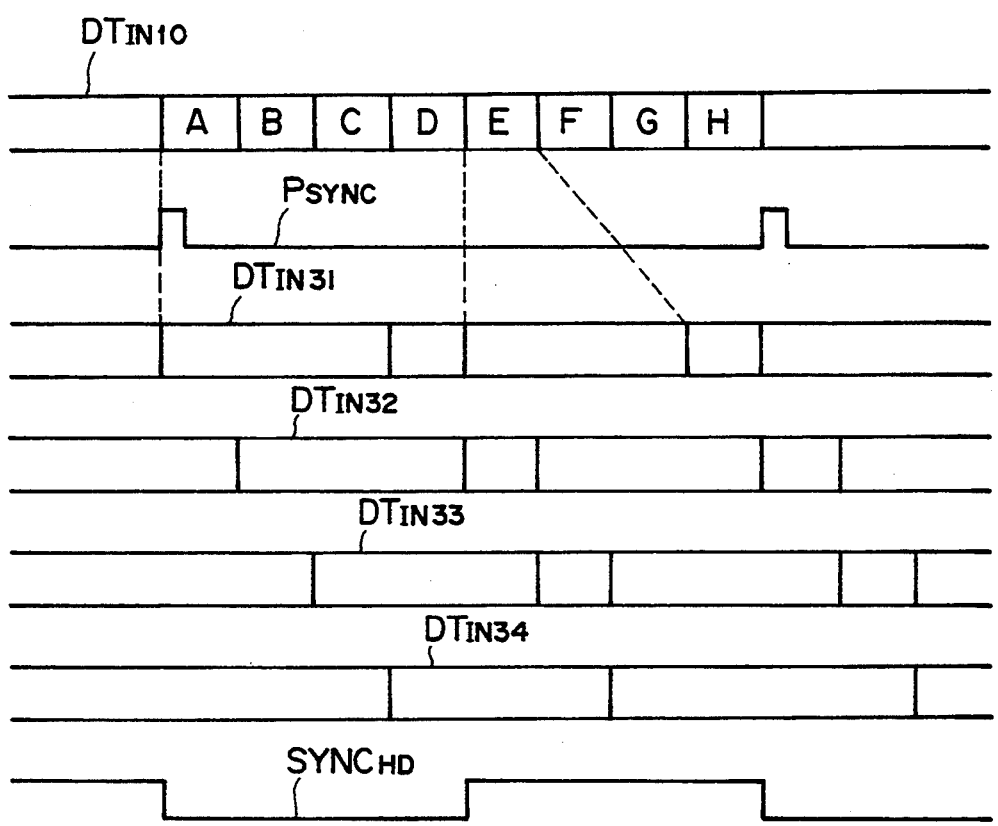

The input selector circuit subjects the information data $DT_{IN10}$, shown in FIG. 10A, to 8-to-16 bit conversion to convert the data to information data $DT_{IN20}$ in 16-bit (2-byte) parallel form. FIG. 10A illustrates successive sectors A, B, C, ... H of data, with each sector being comprised of 256 blocks and each block including 118 bytes of source data, as shown in FIGS. 2 and 4. Then, the sectors of information data $DT_{IN20}$ are distributed for recording in record tracks based on the ID-1 format (i.e., each sector is comprised of 36,108 bytes) in synchronism with a data sync signal $P_{SYNC}$ (FIG. 10-B) which, in turn, represents the phase relation of the input information data $DT_{IN10}$ (FIG. 10-A). That is, data sync signal $P_{SYNC}$ identifies sector A. The first four sectors A, B, C and D of information data $DT_{IN21}$-$DT_{IN24}$ thus obtained are supplied sequentially to time-base converters 32A, 32B, 32C and 32D, and the next four sectors E, F, G and H likewise are supplied sequentially to time base converters 32A, 32B, 32C and 32D.

Each of time base converters 32A-32D includes a FIFO (first-in first-out) memory and serves to add a predetermined blank portion to each sector of the information data $DT_{IN21}$-$DT_{IN24}$ supplied thereto by input selector circuit 31. Thereafter, a sector is read from each time base converter at a frequency of 8 MHz, for example, and fed to 16-8 converters 33A-33D, respectively, as sectors $DT_{IN31}$-$DT_{IN34}$, shown in FIGS. 10C-10F.

The 16-8 converters 33A-33D convert the 16-bit sector information data $DT_{IN31}$, $DT_{IN32}$, $DT_{IN33}$, $DT_{IN34}$, (FIGS. 10-C-10-F) to 8-bit data which then are supplied to corresponding ID-1 recording sections 1A-1D, respectively.

Thus, in the information data recording/reproducing apparatus of FIG. 9, the input information data $DT_{IN10}$ is time-divided into groups of successive sectors in accordance with the phase relation thereof, with each group being comprised of, for example, sectors A, B, C, ... H. These sectors then are supplied sequentially and cyclically to the ID-1 recording sections 1A-1D. In the illustrated example, sector A of input information $DT_{IN10}$ is time-base converted to sector A of sector information data $DT_{IN31}$, sector B of $DT_{IN10}$ is time-base converted to sector B of $DT_{IN32}$, sector C of $DT_{IN10}$ is time-base converted to sector C of $DT_{IN33}$, sector D of $DT_{IN10}$ is time-base converted to sector D of $DT_{IN34}$, sector E of $DT_{IN10}$ is time-base converted to sector E of $DT_{IN31}$, and so on.

Figure 3:
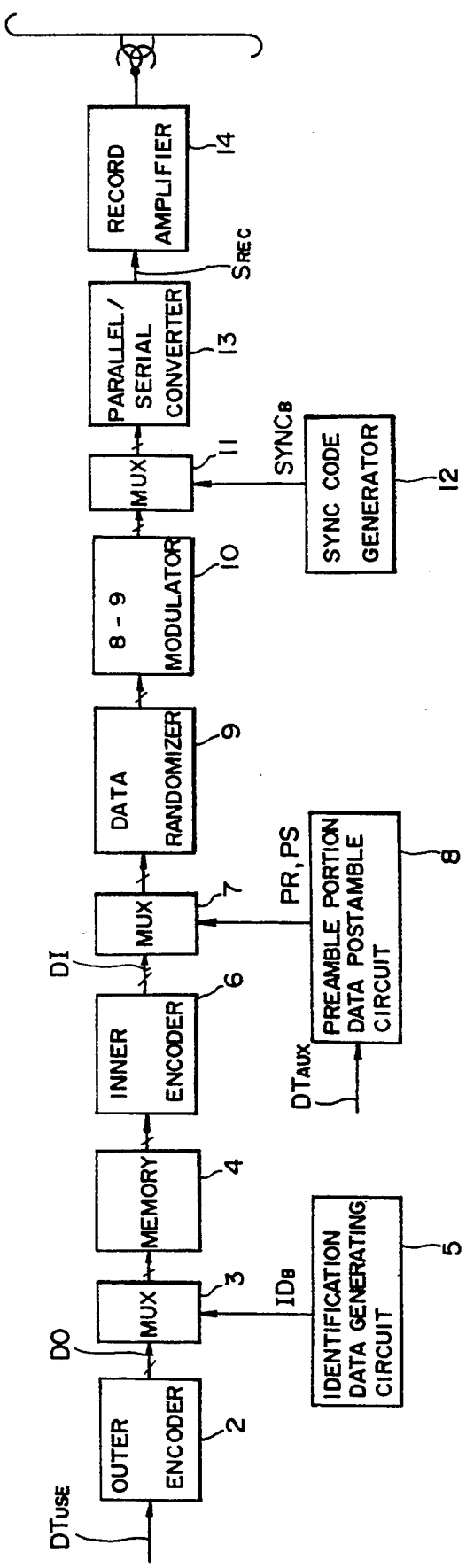

ID-1 recording sections 1A-1D are substantially the same in structure as the recording system of the aforementioned information data recording/reproducing apparatus shown in FIG. 3, and process the sector information data $DT_{IN31}$-$DT_{IN34}$ in the same way to produce record signals $S_{RECA}$-$S_{RECD}$ of the ID-1 format. These record signals $S_{RECA}$-$S_{RECD}$ are respectively supplied via input terminals a and output terminals c of recording/reproducing selector circuits 34A-34D to input terminals d of head switching circuits 35A-35D. The head switching circuits respond to head switching signal $SW_{HD}$ to couple the record signals from output terminals e or f to the magnetic heads 16A-16D for channels (or sectors) A-D or to the magnetic heads 16E-16H for channels (or sectors) E-H. That is, head switching circuits 35A-35D supply sectors A-D of sector information data $DT_{IN31}$-$DT_{IN34}$ comprising record signals $S_{RECA}$-$S_{RECD}$ to heads 16A-16D, respectively, via output terminals e, and the same head switching circuits supply sectors E-H of sector information data $DT_{IN31}$-$DT_{IN34}$ (which comprise record signals $S_{RECA}$-$S_{REDC}$) to heads 16E-16H, respectively, via output terminals f.

Figure 11:
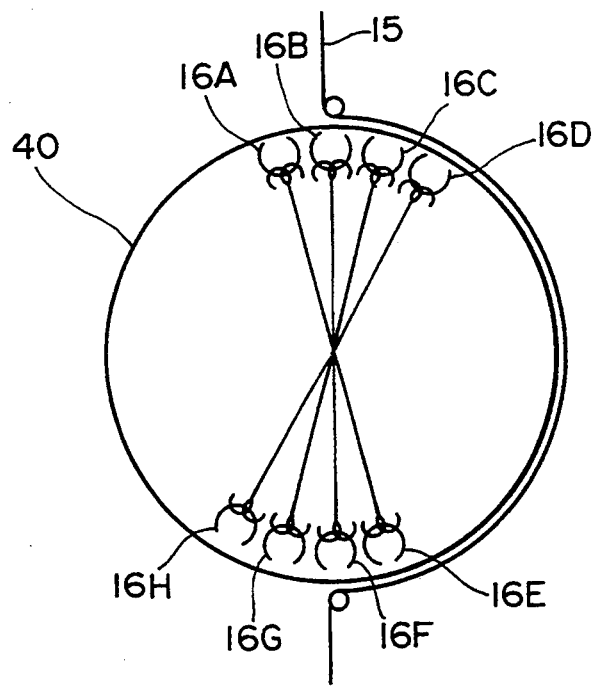

In the information data recording/reproducing apparatus of FIG. 9, the magnetic heads 16A-16D for channels (or sectors) A-D and the magnetic heads 16E-16H for channels (or sectors) E-H are disposed as illustrated in FIG. 11. Here, a magnetic tape 15 is wound obliquely on a rotary head assembly 40 over an angular range of 180 degrees. The magnetic heads 16A-16D for channels A-D are disposed generally at one position, while the magnetic heads 16E-16H for channels E-H are disposed generally at another position spaced apart by an angle of 180 degrees respectively form the corresponding magnetic heads 16A-16D.

Figure 12:
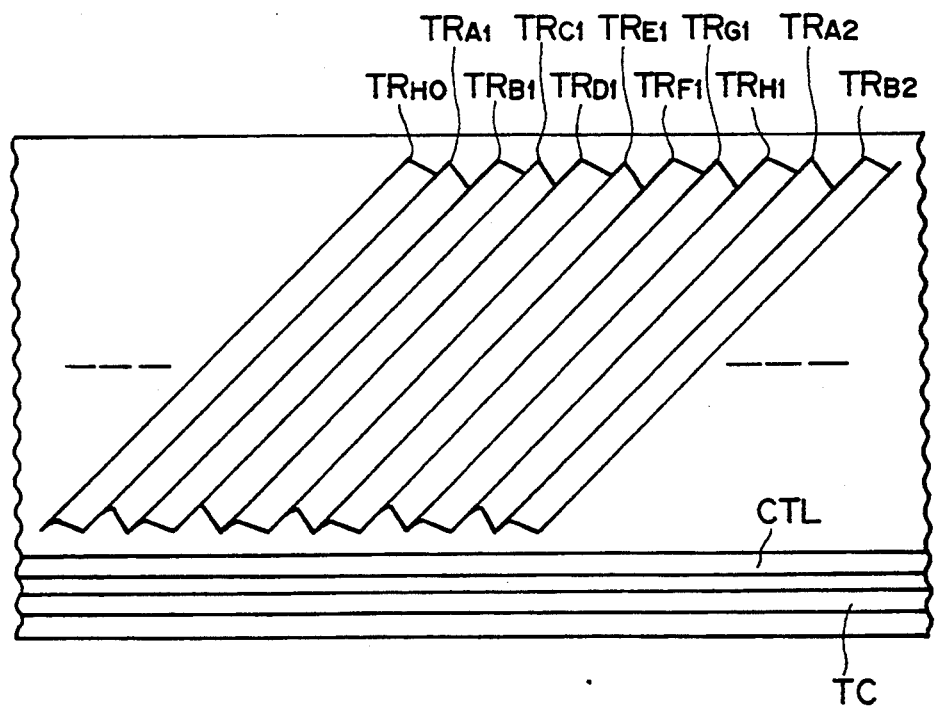

Therefore, with one rotation of the rotary head assembly 40, eight record tracks ..., $TR_{A1}$-$TR_{H1}$ ... corresponding to the channels A-H and containing sectors A-H are formed as illustrated in FIG. 12.

The data sync signal $P_{SYNC}$ (FIG. 10B) which represents the phase relation of the input information data $DT_{IN10}$ is supplied as an input to a reference sync signal generator 36 (FIG. 9).

The reference sync signal generator includes a PLL (phase locked loop) and generates a head controlling reference sync signal $SYNC_{HD}$ (FIG. 10-G) which rises and falls periodically at the frequency of the input data sync signal $P_{SYNC}$ (FIG. 10-B). This signal $SYNC_{HD}$ is applied to the first ID-1 recording section 1A and to the first ID-1 reproducing section 20A; and it also is coupled to a drum servo circuit, a capstan servo circuit and a head switching control circuit (none of which are shown).

Thus, a control track reference signal produced from the head controlling reference sync signal $SYNC_{HD}$ is written on the control track CTL on the magnetic tape 15 by, for example, a stationary head (not shown) at positions corresponding to the channel-A record tracks ..., $TR_{A1}$, $TR_{A2}$, ..., that is, in a predetermined relation to these channel-A record tracks, and the magnetic heads 16A–16D and 16E–16H are selectively switched under control of the head controlling reference sync signal $SYNC_{HD}$.

In this manner, the sectors of input information data $DT_{IN10}$ are sequentially recorded, phase locked to the head controlling reference sync signal $SYNC_{HD}$, on eight record tracks $TR_{A1}$–$TR_{H1}$ corresponding to the channels A–H.

In a playback mode of the information data recording/reproducing apparatus, the drum servo circuit controls the rotation phase of the rotary head 40 in synchronism with the head controlling reference sync signal $SYNC_{HD}$ which is synchronized with the data sync signal $P_{SYNC}$ now supplied to the apparatus for external synchronization. Hence, the beginning phase of the data reproduced from each track is synchronized with the head controlling reference sync signal $SYNC_{HD}$. The capstan servo circuit controls the tape transport such that the channel-A or channel-E magnetic head 16A or 16E is positioned to scan the channel-A record tracks ..., $TR_{A1}$, $TR_{A2}$, ... in response to the head controlling reference sync signal $SYNC_{HD}$ and the control track reference signal which had been recorded on the control track CTL of the magnetic tape 15. In this manner, the tape transport is controlled so that the channel of the magnetic head which plays back a track in the playback mode is the same as the channel of the magnetic head that recorded that track in the recording mode.

Thus, the record tracks ..., $TR_{A1}$–$TR_{H1}$, ... on the magnetic tape 15 are sequentially read out by magnetic heads 16A–16D for the channels (or sectors) A–D and by magnetic heads 16E–16H for the channels (or sectors) E–H respectively, to supply the playback signals $S_{PBA}$–$S_{PBD}$ via the head switching circuits 35A–35D and the recording/reproducing selector circuits 34A–34D respectively to the ID-1 reproducing sections 20A–20D.

The ID-1 reproducing sections 20A–20D are substantially the same in structure as the reproducing system of the aforementioned information data recording/reproducing apparatus shown in FIG. 8, and playback data $DT_{OUT11}$–$DT_{OUT14}$ respectively obtained from the ID-1 reproducing sections 20A–20D is in the form of 9-bit parallel data comprised of 8-bit information plus a 1-bit data error flag added thereto. This playback data is supplied to 9-18 converters 37A–37D, respectively.

The 9-18 converters 37A–37D convert the 9-bit parallel playback data $DT_{OUT11}$–$DT_{OUT14}$ to 18-bit (2-byte) parallel playback data $DT_{OUT21}$–$DT_{OUT24}$, which is fed to corresponding time base inverse converters 38A–38D respectively.

Each time base inverse converter 38A–38D is comprised of a FIFO memory similar to that of the time base converters 32A–32D, to read out the 18-bit parallel playback data $DT_{OUT21}$–$DT_{OUT24}$ fed from the time base inverse converters at a read-out frequency of 32 MHz. It is appreciated that such FIFO memory has a sector written thereinto at one rate (e.g. 8 MHz) and read therefrom at another rate (e.g. 32 MHz). The read data $DT_{OUT31}$–$DT_{OUT34}$ from the time base inverse converters 38A–38D are supplied to an output selector circuit 39 in sequence and in succession at a timing similar to that shown in FIG. 10A (i.e. sector A of $DT_{OUT31}$ followed by sector B of $DT_{OUT32}$, ... followed by sector E of $DT_{OUT31}$, followed by sector F of $DT_{OUT32}$, etc.), and then the time base converted 18-bit parallel playback data $DT_{OUT31}$–$DT_{OUT34}$ are converted to 9-bit parallel playback data $DT_{OUT40}$ comprised of 8-bits of information plus an error flag of 1-bit data. The playback data $DT_{OUT40}$ thus obtained is provided as an output.

The first ID-1 reproducing section 20A carries out its playback operation in synchronism with the head controlling reference sync signal $SYNC_{HD}$ generated in synchronism with the data sync signal $P_{SYNC}$ supplied in the playback mode for external synchronization. Hence, the phase relation of the information data $DT_{IN10}$ that had been supplied for recording is maintained in the playback data $DT_{OUT40}$.

The tracks ..., $TR_{A1}$–$TR_{H1}$, ... that were recorded in conformity with the phase relation of the information data $DT_{IN10}$ during the record mode are reproduced during the playback mode in synchronism with the control track reference signal recorded in the control track CTL on the magnetic tape 15. Consequently, the playback data $DT_{OUT40}$ is produced with the same phase relation as the information data $DT_{IN10}$.

It is appreciated that, during recording, the sectors included in the information data $DT_{IN10}$ are distributed to respective predetermined tracks on the magnetic tape 15 in synchronism with the data sync signal $P_{SYNC}$ which represents the phase relation of the input information data $DT_{IN10}$. In the playback mode, the playback operation is performed in synchronism with the control track reference signal recovered from the control track CTL on the magnetic tape 15. Hence, in the playback mode, the phase relation of the recorded input information data $DT_{IN10}$ is restored.

Thus, the synchronization required to form eight record tracks during one rotation of the rotary head assembly is simplified, resulting in an improved information data recording/reproducing apparatus which is of simple structure and is capable of performing a faster information data recording operation.

In the illustrative embodiment described above, the rotary head assembly is equipped with an eight-channel magnetic head assembly for recording information data that has been divided and distributed thereto. However, it is to be understood that the present invention is not limited to this example alone and is also applicable to a magnetic recording/reproducing apparatus where the rotary head assembly is provided with a different number of magnetic heads to record two or more channels.

Furthermore, the present invention is not limited to the above embodiment where synchronization is effected at the very beginning of the input information data. Rather, any desired phase synchronizing phase relation may be employed and proper phase synchronization can be attained, both for recording and reproducing, with respect to a predetermined bit position or a predetermined byte position in the information data.

While the above embodiment represents an illustrative application of the present invention to magnetic recording/reproducing apparatus that operates in accordance with the ID-1 format, the present invention is widely applicable to other apparatus designed for dividing and recording information data on a magnetic tape in, for example, separate channels.

What is claimed is:

1. A digital information data recording apparatus for recording digital information data on a recording medium, said apparatus comprising:

means receiving an input sync signal and input digital information data for dividing said input digital information data, in synchronism with said input sync signal, into a plurality of sectors each corresponding to a predetermined amount of the input digital information data, said input sync signal being indicative of a predetermined phase relation between a predetermined number of said sectors of said divided digital information data;

means for distributing said plurality of sectors of said divided digital information data into a plurality of channels;

a plurality of time base expanders provided for said plurality of channels each for time base expanding a sector of said divided digital information data distributed to a respective channel;

a plurality of rotary heads provided for said plurality of channels each for recording on a slant track on said recording medium the sector of the time base expanded digital information data distributed to the respective channel;

reference sync signal generator means receiving said input sync signal for generating a reference sync signal phase-locked to said input sync signal; and control signal recording means for recording a control signal, in response to said reference sync signal, on a longitudinal track on said recording medium at positions corresponding to the slant tracks formed by a predetermined one of said plurality of rotary heads.

2. A digital information data reproducing apparatus for reproducing digital information data recorded on a recording medium, comprising:

a plurality of rotary heads provided for a plurality of channels for reproducing sectors of said digital information data from slant tracks on said recording medium, said digital information data having been divided into said sectors in synchronism with a sync signal which is indicative of a predetermined phase relation between a predetermined number of said sectors, time base expanded, distributed into said plurality of channels and recorded on said slant tracks corresponding to said plurality of channels;

control signal reproducing means for reproducing a control signal from a longitudinal track on said recording medium, said control signal having been recorded based upon said sync signal at positions on said longitudinal track corresponding to the slant tracks of a predetermined one of said plurality of channels, said control signal reproduced by said control signal reproducing means being used to determine a relationship between said plurality of rotary heads and the slant tracks to be reproduced thereby;

a plurality of time base compressors provided for said plurality of channels for time base compressing said digital information data reproduced by said rotary heads; and output means for combining the digital information data from said plurality of time base compressors into output digital information data.

3. A digital information data recording and reproducing apparatus comprising:

means receiving an input sync signal and input digital information data for dividing said input digital information data, in synchronism with said input sync signal, into a plurality of sectors each corresponding to a predetermined amount of the input digital information data, said input sync signal being indicative of a predetermined phase relation between a predetermined number of said sectors of said digital information data;

means for distributing said plurality of sectors of said digital information data into a plurality of channels;

a plurality of time base expanders provided for said plurality of channels each for time base expanding a sector of said digital information data distributed to a respective channel;

a plurality of rotary heads provided for said plurality of channels each for recording on a slant track on a recording medium the sector of the time base expanded digital information data distributed to the respective channel;

reference sync signal generator means receiving said input sync signal for generating a reference sync signal phase-locked to said input sync signal;

control signal recording means for recording a control signal, in response to said reference sync signal, on a longitudinal track on said recording medium at positions corresponding to the slant tracks formed by a predetermined one of said plurality of rotary heads;

control signal reproducing means for reproducing said control signal from said longitudinal track formed on said recording medium, said control signal reproduced by said control signal reproducing means being used to determine a relationship between said plurality of rotary heads and the slant tracks to be reproduced thereby;

a plurality of time base compressors provided for said plurality of channels for time base compressing said digital information data reproduced by said rotary heads; and output means for combining the digital information data from said plurality of time base compressors into output digital information data.

* * * * *